W. H. PERRY.

Manufacture of Bar Iron.

No. 3,787. Reissued Jan'y 4, 1870.

Witnesses:
Randolph Coyle Jr.
Augustus Pohlers.

Inventor:
William H. Perry.
By his Attorney
Amos Beaney

N. PETERS, Photo-Lithographer, Washington, D. C.

United States Patent Office.

WILLIAM H. PERRY, OF SHARON, PENNSYLVANIA.

*Letters Patent No.* 33,006, *dated August* 6, 1861; *reissue No.* 3,787, *dated January* 4, 1870.

IMPROVEMENT IN THE MANUFACTURE OF BAR-IRON.

The Schedule referred to in these Letters Patent and making part of the same.

*To all whom it may concern:*

Be it known that I, WILLIAM H. PERRY, of Sharon, in the county of Mercer, and State of Pennsylvania, have invented a new and useful Improvement in the Manufacture of Iron; and I do hereby declare the following to be a full, clear, and exact description thereof, reference being had to the accompanying drawing, making a part of this specification, in which—

Like letters of reference indicate like parts of each.

Figure 1:
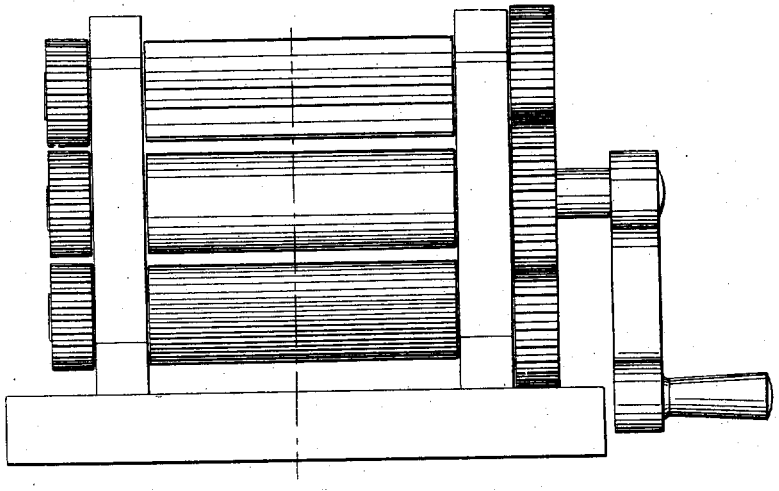
Figure 1 is a side elevation of a machine which I use in practising my improvement.
Figure 2:
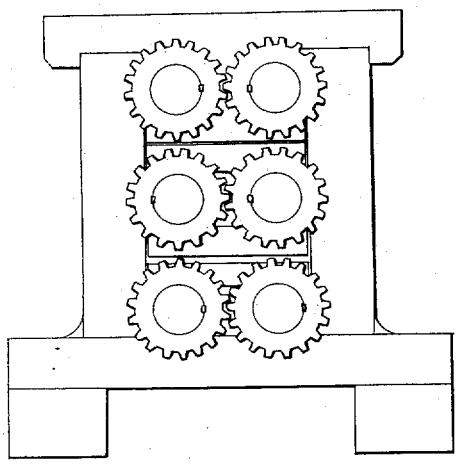
Figure 2 is an end view thereof.
Figure 3:
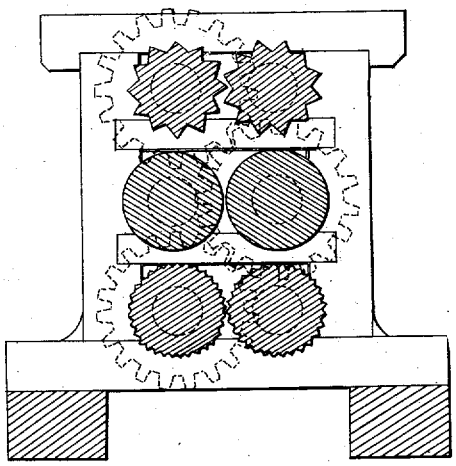
Figure 3 is a vertical transverse section taken on the line A A', fig. 1.

The nature of my invention consists in an improvement in the process of manufacturing iron, and in the construction of apparatus adapted for use in such process.

In the puddling or boiling-process, as carried on previous to the date of my invention, a considerable expenditure of time, labor, and material was required.

A bottom had to be made in the furnace, and fixing prepared, after which the charge of pig-metal was introduced, with a sufficient quantity of cinder.

This had to be melted, stirred up, turned over, with the fire, at various stages of the process, burning more or less vigorously and clearly.

Finally, the iron begins to boil and bubble, in which stage it remains for some little time, and requires continuous stirring.

It gradually becomes sticky, comes to nature, and passes into a spongy state, when it is worked up into balls, and taken thence to the squeezers and rolls.

An exceedingly high temperature is required, in order to melt the pig-metal, and keep it at the proper degree of fluidity.

The bottom and sides of the furnace must be protected from melting or burning.

The melted iron requires almost constant stirring, turning and manipulating, in order to secure the proper decarbonization throughout its mass, and also to prevent its sticking to the sides and bottom of the furnace, and the result of the process, or the quality of iron produced, depends largely on the skill of the puddler.

By my improvement, I shorten the process, lessen the cost of the skilled labor required, and effect a great saving of time, fuel, labor, and material.

To enable others skilled in the art to make and use my invention, I will proceed to describe the same.

I run the metal from the blast-furnace, or from a remelting-furnace, and let it solidify.

While it is at, or about at a red heat, it is extremely crummy or friable.

While it is in this condition, viz, at or a little above a red heat, I break it up and throw it into a crushing-machine, and reduce it to a pulverized state, or crumble it up like sawdust.

One form of machine designed for such use is shown in the drawing, consisting of six crushing-rollers A A, B B, C C, mounted in a frame or housing, D.

The upper pair A A has large flutings or corrugations, the middle pair B B is made plain, and the lower pair C C has smaller corrugations, as shown, the corrugations in each case meshing into each other, and all of them being so arranged with reference to each other, that the iron will be crushed more finely by each lower pair of rolls.

The rolls are made to rotate in the directions indicated by the arrow, by means of cog-wheels on their ends.

This crumbled or crushed metal, I introduce in the hot furnace, through a hopper placed on the top of each furnace for that purpose, or otherwise, in quantities of about two hundred and twenty-five pounds, more or less, as may be desired, and spread it over the bottom of the furnace as evenly as possible. I then close the furnace-door, and in a few minutes the iron comes to nature, after which it is worked together in a large ball, which is passed through the squeezers, and then through the rolls, in the ordinary manner.

While the first ball is in the squeezers, the furnace-man is scraping the second one together, and has it ready to follow the first one through the squeezers.

Two balls are made at each heat. When the last ball is removed, the furnace-man pulls a little catch in the bottom of the hopper, which allows the next charge to drop into the furnace, and so on, the whole day.

By the process now in use, a furnace worked both turns, that is, night and day, or about nineteen hours and a half, yields fifty hundred and fifty pounds of muck-bar, whereas, by my process, a furnace-man and helper, with a furnace of equal capacity, make over eight thousand pounds of muck-bar in twenty hours, equal, if not better in quality, to that made by the old process.

The time, scrap, coal, and ore that are now wasted at the end of each turn, fixing up the furnace, are all saved by my process, as the furnace is not injured in the practice of it.

The pulverized iron is rapidly decarbonized, and comes to nature without necessarily being remelted.

To the successful operation of my invention, it is only necessary that the metal be crushed, pulverized, or minutely subdivided while hot, and for this purpose it may be fed into the crushers after coming from the blast or melting-furnace, and has solidified, and before it has cooled, or it may be reheated in any suitable furnace, though the former is the preferable course to pursue.

Likewise, in my mode of preparing the iron, I do not limit myself to the rolls described, since the number or shape of the rolls may be varied at pleasure, or other suitable crushing-apparatus may be substituted therefor.

What I claim as my invention, and desire to secure by Letters Patent, is—

1. The manufacture of wrought-iron, by crushing the blast-furnace or pig-metal at or a little above a red heat, charging the pulverized metal into a puddling or other suitable furnace, and converting and balling the charges successively, substantially in the manner hereinbefore set forth.

2. Two or more pairs of crushing-rolls, arranged so as to be operative in the crushing of red-hot cast-iron, substantially as described.

In witness whereof, I, the said WILLIAM H. PERRY, have hereunto set my hand.

WILLIAM H. PERRY.

Witnesses:
JOHN GLENN,
R. C. WRENSHALL.